(12) United States Patent
Park

(10) Patent No.: US 10,449,993 B2
(45) Date of Patent: Oct. 22, 2019

(54) TILT FIXING DEVICE OF VEHICULAR STEERING COLUMN

(71) Applicant: MANDO CORPORATION, Pyeongtaek-si, Gyeonggi-do (KR)

(72) Inventor: Sang Hyun Park, Yongin-si (KR)

(73) Assignee: MANDO CORPORATION, Pyeongtaek-si, Gyeonggi-Do (KR)

( * ) Notice: Subject to any disclaimer, the term of this patent is extended or adjusted under 35 U.S.C. 154(b) by 82 days.

(21) Appl. No.: 15/878,077

(22) Filed: Jan. 23, 2018

(65) Prior Publication Data

US 2018/0208230 A1 Jul. 26, 2018

(30) Foreign Application Priority Data

Jan. 26, 2017 (KR) .......................... 10-2017-0012718
Aug. 16, 2017 (KR) .......................... 10-2017-0103843

(51) Int. Cl.
  *B62D 1/19* (2006.01)
  *B62D 1/184* (2006.01)
  *B62D 1/189* (2006.01)

(52) U.S. Cl.
  CPC .............. *B62D 1/184* (2013.01); *B62D 1/189* (2013.01)

(58) Field of Classification Search
  CPC ................................. B62D 1/184; B62D 1/189
  USPC .................................................... 74/492, 493
  See application file for complete search history.

(56) References Cited

U.S. PATENT DOCUMENTS

| 4,900,059 A * | 2/1990 | Kinoshita ............. B62D 1/181 280/775 |
| 5,338,064 A * | 8/1994 | Sadakata ............... B62D 1/184 280/775 |
| 2007/0295144 A1* | 12/2007 | Nishioka ............... B62D 1/184 74/493 |

(Continued)

OTHER PUBLICATIONS

Office Action issued in corresponding German Application No. 10 2018 201 197.4, dated Mar. 13, 2019.

*Primary Examiner* — Toan C To
(74) *Attorney, Agent, or Firm* — Morgan, Lewis & Bockius LLP

(57) ABSTRACT

The present embodiments provides a tilt fixing device of a vehicular steering column, including: a tilt bracket having a tilt hole formed in a tilt support foiuied on an outer side of a distance bracket, a first threaded portion being formed on a first side surface of the tilt hole, a stepped portion being formed to protrude from a second side surface of the tilt hole, which faces the first side surface, so as to have a level difference with regard to the tilt support, and a second threaded portion being formed on the stepped portion; a lever bolt coupled to an adjustment lever so as to rotate while interworking with the adjustment lever, the lever bolt being installed to penetrate the distance bracket and the tilt hole; and a movable gear having an insertion hole formed to be penetrated by the lever bolt and having a movable threaded portion formed on an outer peripheral surface so as to be inserted into the tilt hole such that the movable threaded portion meshes with the first threaded portion and the second threaded portion and becomes fixed during tilt locking of the adjustment lever and, during tilt unlocking of the adjustment lever, the movable gear is spaced from the first threaded portion, meshes with the second threaded (Continued)

portion, and makes a rotational movement in a tilting direction.

12 Claims, 8 Drawing Sheets

(56) References Cited

U.S. PATENT DOCUMENTS

| | | |
|---|---|---|
| 2008/0143092 A1 | 6/2008 | Menjak et al. |
| 2011/0056324 A1* | 3/2011 | Park .................... B62D 1/184 |
| | | 74/493 |
| 2012/0304795 A1 | 12/2012 | Tinnin et al. |
| 2016/0176433 A1* | 6/2016 | Okano .................. B62D 1/184 |
| | | 74/495 |
| 2018/0208229 A1* | 7/2018 | Kwon .................... B62D 1/184 |
| 2018/0208231 A1* | 7/2018 | Kwon .................... B62D 1/184 |

\* cited by examiner

TILT FIXING DEVICE OF VEHICULAR STEERING COLUMN

CROSS REFERENCE TO RELATED APPLICATION

This application claims priority from Korean Patent Application No. 10-2017-0012718, filed on Jan. 26, 2017, and Korean Patent Application No. 10-2017-0103843, filed on Aug. 16, 2017, which are hereby incorporated by reference for all purposes as if fully set forth herein.

BACKGROUND OF THE INVENTION

1. Field of the invention

The present embodiments relate to a vehicular steering column and, more particularly, to a tilt fixing device of a vehicular steering column.

2. Description of the Prior Art

Recent automobiles are provided with steering columns having additional telescopic or tilting functions for driver convenience. Telescopic devices enable the steering columns to extend and contract in the axial direction, and tilting devices are configured to adjust the angle of the steering columns.

The tilting operation of such a steering column is applied by fastening and unfastening an adjustment lever. When the adjustment lever is fastened, a movable gear coupled to an end of a lever bolt meshes with a stationary gear such that no tilting operation occurs. When the adjustment lever is unfastened, the stationary gear and the movable gear disengage from each other and enable the tilting operation.

However, conventional automobile steering columns have a problem in that, during the tilting operation, threads of the stationary gear and threads of the movable gear may engage with each other (tooth-on-tooth phenomenon), failing to provide the desired locking. This degrades the driver's feeling of lever manipulation and, even worse, may fracture the lever or the gears, inconveniencing the driver.

Furthermore, if unstable fixing of the steering column due to the tooth-on-tooth phenomenon of gears is followed by a collision of the automobile, the steering column pops up in the tilting direction, making it impossible to secure the driver's safety.

SUMMARY OF THE INVENTION

Present embodiments, which have been made to solve the above-mentioned problems, provide a tilt fixing device of a vehicular steering column configured such that, when the driver locks the tilt, no tooth-on-tooth phenomenon occurs between the stationary gear and the movable gear, and the tilting operation of the steering column proceeds stably, thereby securing the driver's safety.

Besides the above-described technical aspects of the present embodiments, other features and advantageous effects of the present embodiments will be described below or could be clearly understood by a person skilled in the art to which the present embodiments pertain from such descriptions and explanations.

A tilt fixing device of a vehicular steering column according to the present embodiments includes: a tilt bracket having a tilt hole formed in a tilt support formed on an outer side of a distance bracket, a first threaded portion being formed on a first side surface of the tilt hole, a stepped portion being formed to protrude from a second side surface of the tilt hole, which faces the first side surface, so as to have a level difference with regard to the tilt support, and a second threaded portion being formed on the stepped portion; a lever bolt coupled to an adjustment lever so as to rotate while interworking with the adjustment lever, the lever bolt being installed to penetrate the distance bracket and the tilt hole; and a movable gear having an insertion hole formed to be penetrated by the lever bolt and having a movable threaded portion formed on an outer peripheral surface so as to be inserted into the tilt hole such that the movable threaded portion meshes with the first threaded portion and the second threaded portion and becomes fixed during tilt locking of the adjustment lever and, during tilt unlocking of the adjustment lever, the movable gear is spaced from the first threaded portion, meshes with the second threaded portion, and makes a rotational movement in a tilting direction.

In addition, a tilt fixing device of a vehicular steering column according to the present embodiments includes: a tilt bracket having an incision hole formed in a tilt support formed on an outer side of a distance bracket; a gear member coupled to the incision hole, the gear member having a tilt hole formed in an inner side, an end of the gear member having a first threaded portion faulted on a first side surface of the tilt hole, a stepped portion being formed to protrude from a second side surface of the tilt hole so as to have a level difference with regard to the tilt support, and a second threaded portion being formed on the stepped portion; a lever bolt coupled to an adjustment lever so as to rotate while interworking with the adjustment lever, the lever bolt being installed to penetrate the distance bracket and the tilt hole; and a movable gear having an insertion hole foamed to be penetrated by the lever bolt and having a movable threaded portion formed on an outer peripheral surface so as to be inserted into the tilt hole such that the movable threaded portion meshes with the first threaded portion and the second threaded portion and becomes fixed during tilt locking of the adjustment lever and, during tilt unlocking of the adjustment lever, the movable gear is spaced from the first threaded portion, meshes with the second threaded portion, and makes a rotational movement in a tilting direction.

A tilt fixing device of a vehicular steering column according to the present embodiments has the following advantageous effects: when the driver locks the tilt, the movable gear, which rotates along a part of the stationary gear, can prevent the tooth-on-tooth phenomenon between the stationary gear and the movable gear. Furthermore, by preventing the tooth-on-tooth phenomenon between the stationary gear and the movable gear, the driver can be provided with a stable lever manipulation feeling, and the steering column is prevented from popping up due to an external impart and the like, thereby securing the driver's safety.

Besides, other features and advantageous effects of the present embodiments could be newly understood through the present embodiments.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Figure 1:
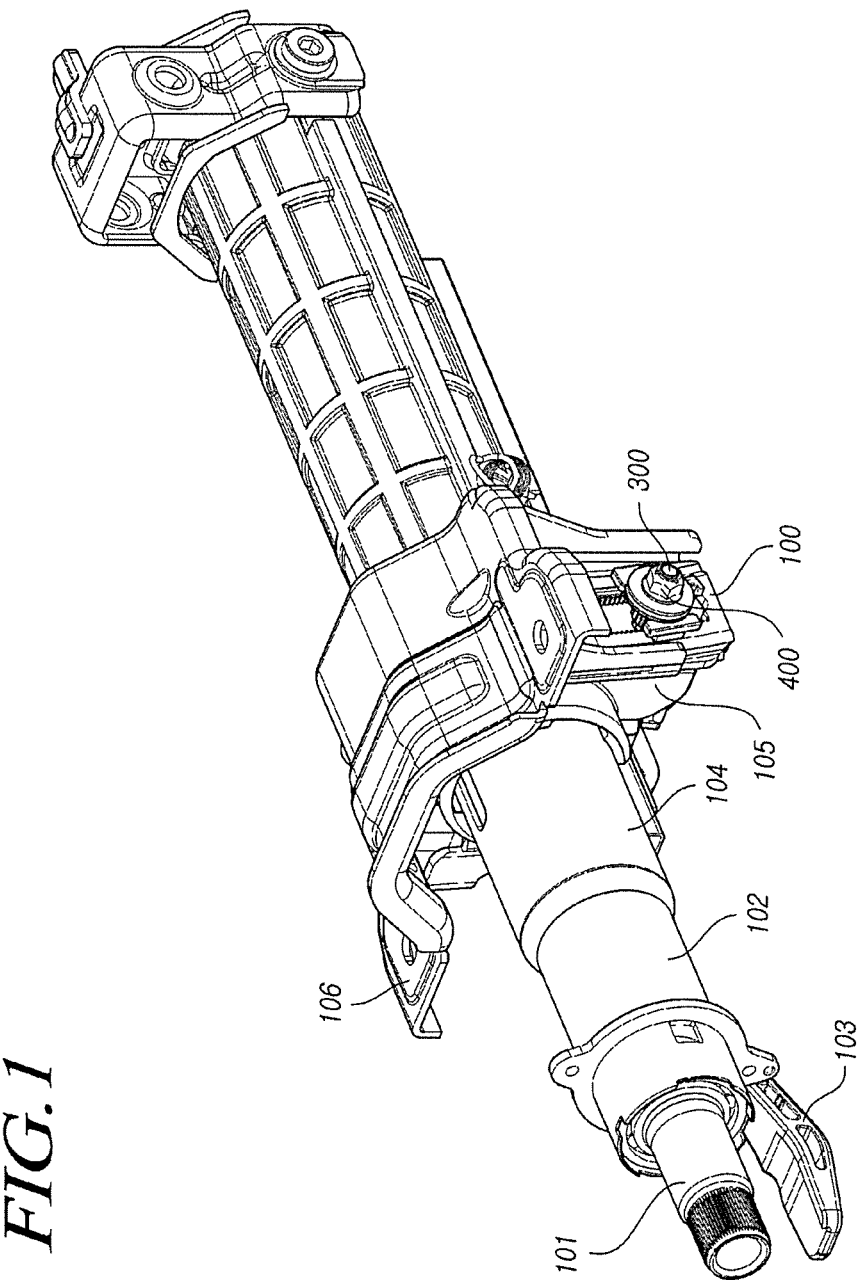
FIG. 1 is a perspective view illustrating a vehicular steering column according to the present embodiments.

Hereinafter, the present embodiments will be described in detail with reference to the accompanying drawings such that a person skilled in the art to which the present embodiments pertain could easily implement the same. The present embodiments could be realized in various different forms, and are not limited to the embodiments described herein.

For clear description of the present embodiments, details irrelevant to the description will be omitted, and the same or similar elements will be designated by the same reference numerals throughout the specification.

In embodiments of the present disclosure, when it is described that an element is "connected" to another element, not only the first element may be "connected directly" to the second element, but the first element may also be "electrically connected" to the second element while a third element is interposed therebetween. In the entire specification of the present application, when it is described that a certain unit "includes" a certain element, this means that the unit may include any other element rather than exclude the any other element unless otherwise described.

Hereinafter, the present embodiments will be described in detail with reference to the accompanying drawings such that a person skilled in the art to which the present embodiments pertain could easily implement the same. However, the present embodiments could be realized in various different forms, and are not limited to the embodiments described herein.

Figure 2:
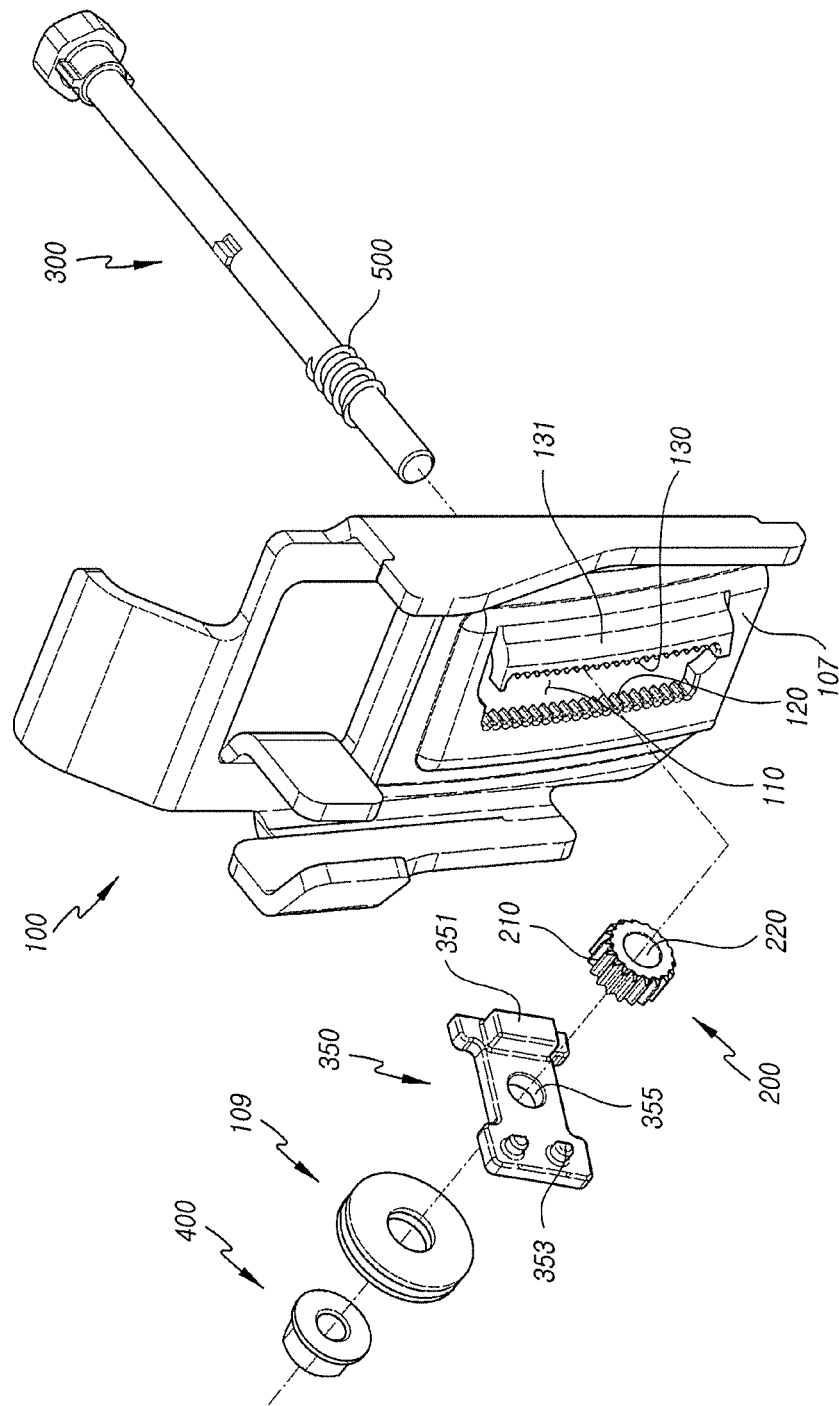
FIG. 2 is an exploded perspective view illustrating a tilt fixing device of a vehicular steering column according to the present embodiments.
Figure 3:
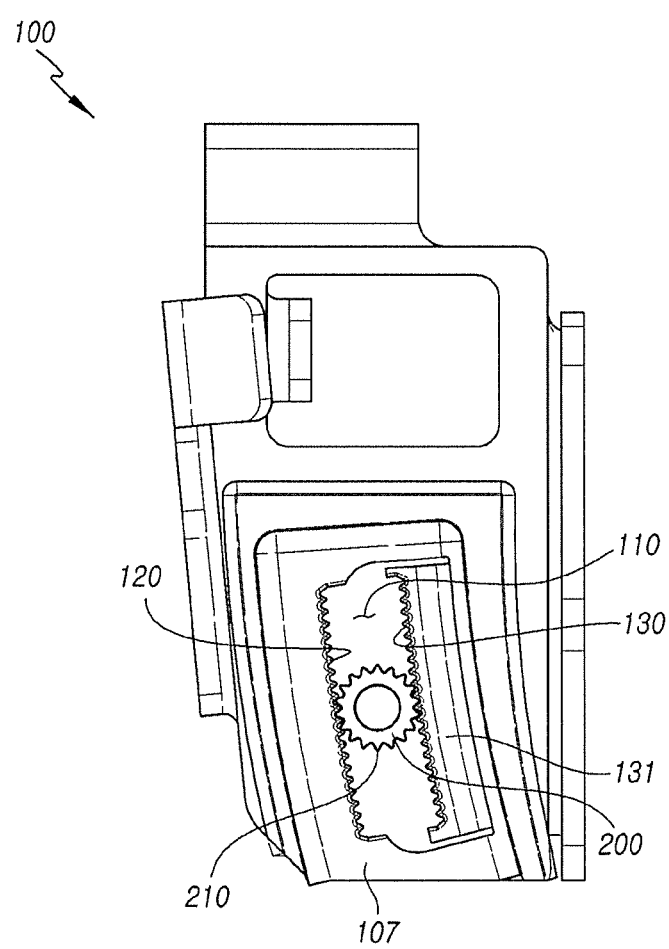
FIG. 3 is a front view illustrating a part of a tilt fixing device of a vehicular steering column according to the present embodiments.
Figure 4:
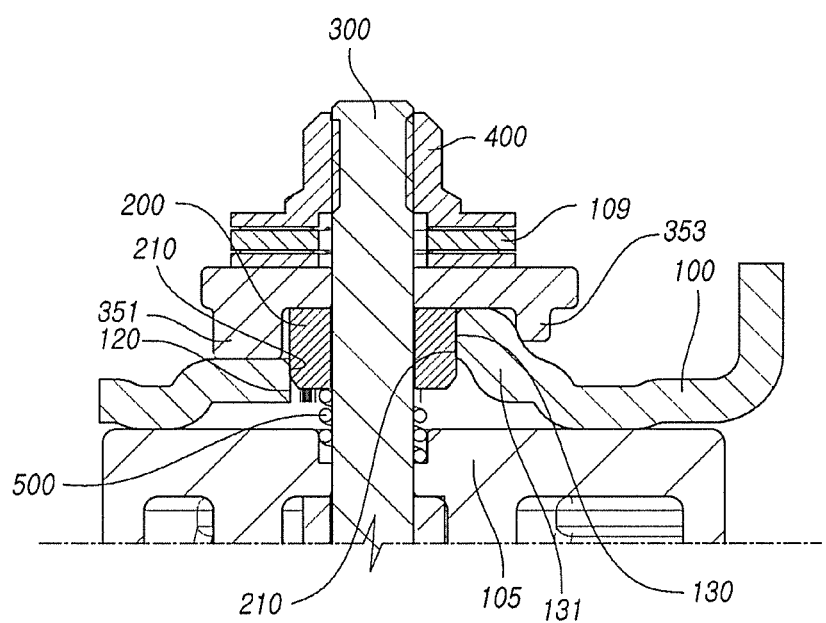
FIG. 4 and FIG. 5 are sectional views illustrating parts of a tilt fixing device of a vehicular steering column according to the present embodiments.
Figure 5:
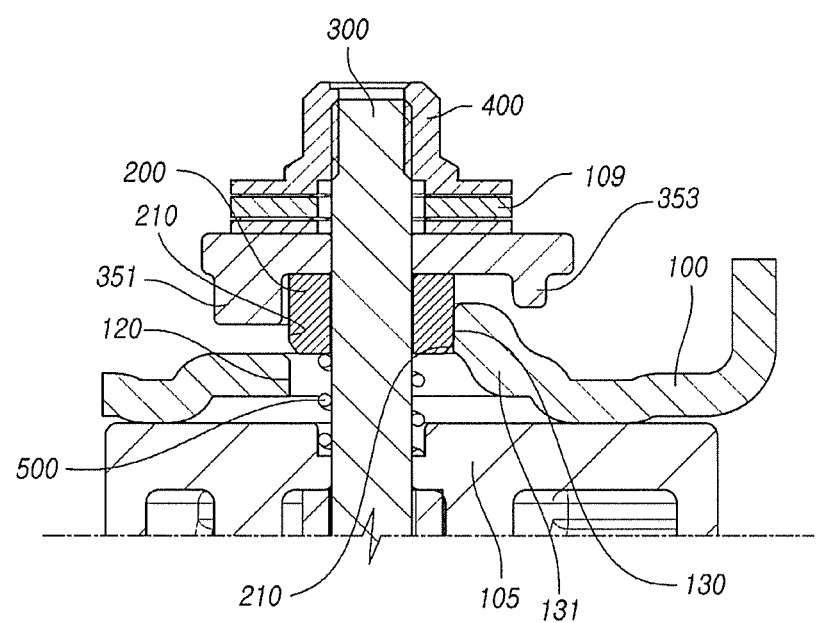
Figure 6:
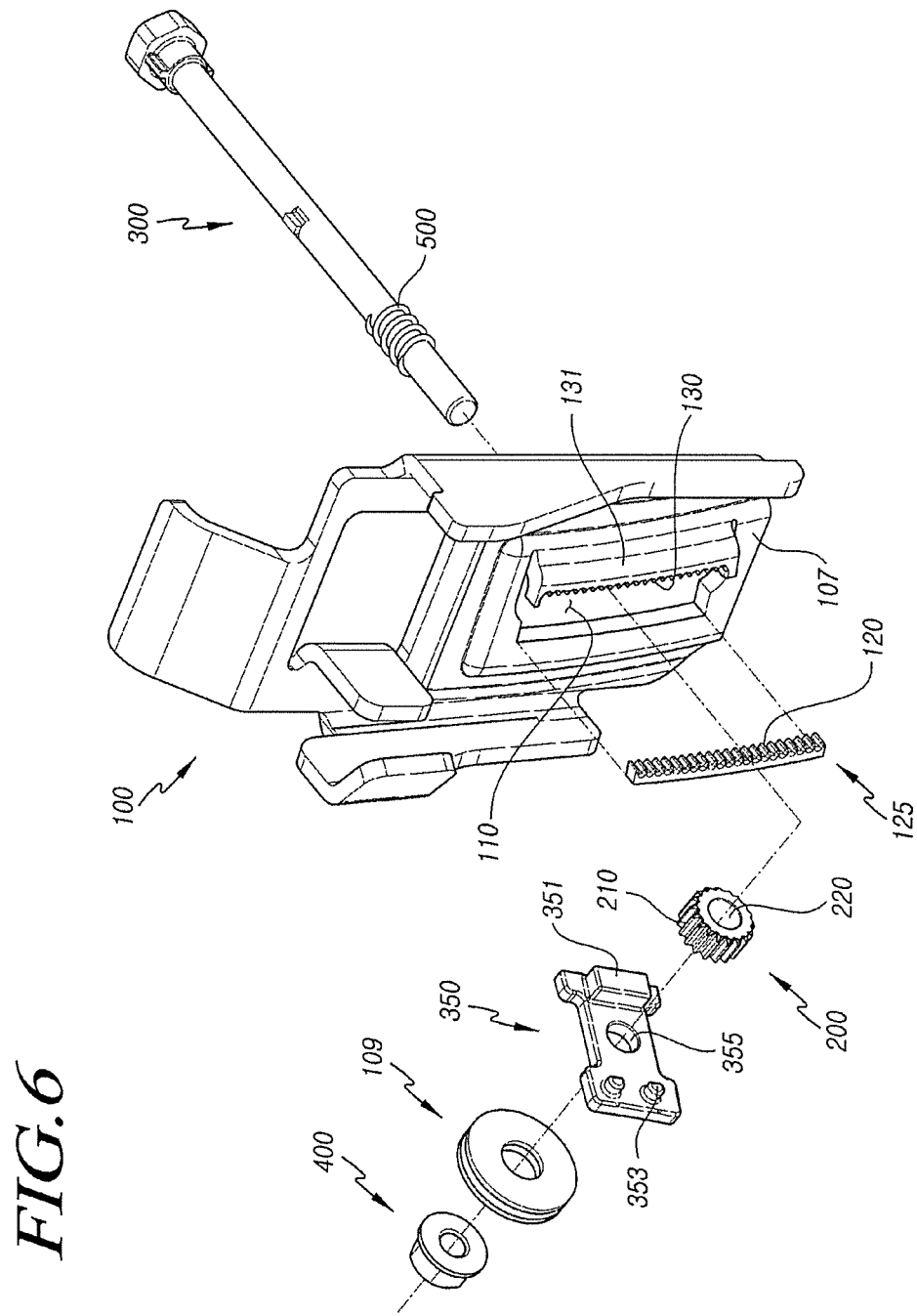
FIG. 6 to FIG. 8 are exploded perspective views illustrating parts of a tilt fixing device of a vehicular steering column according to the present embodiments.
Figure 7:
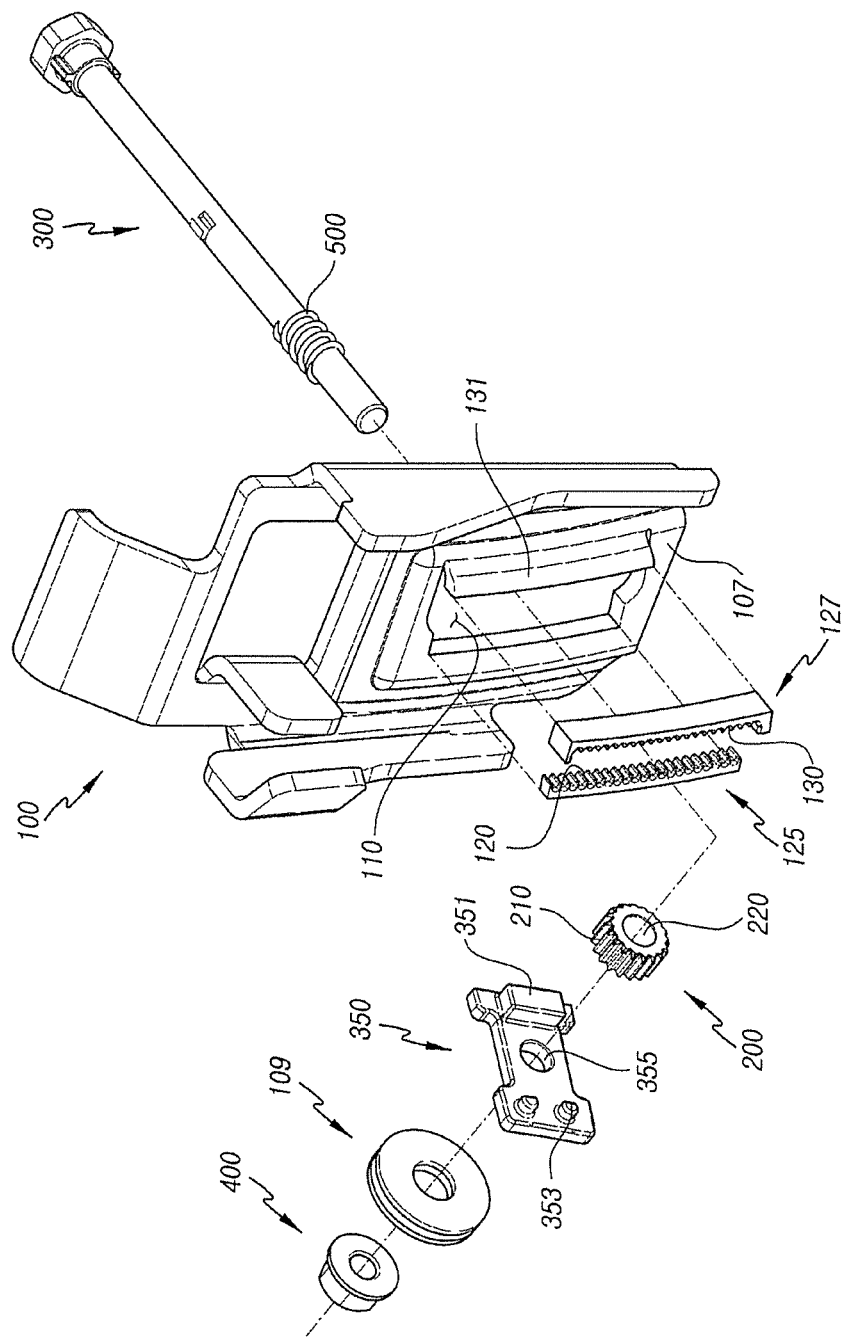
Figure 8:
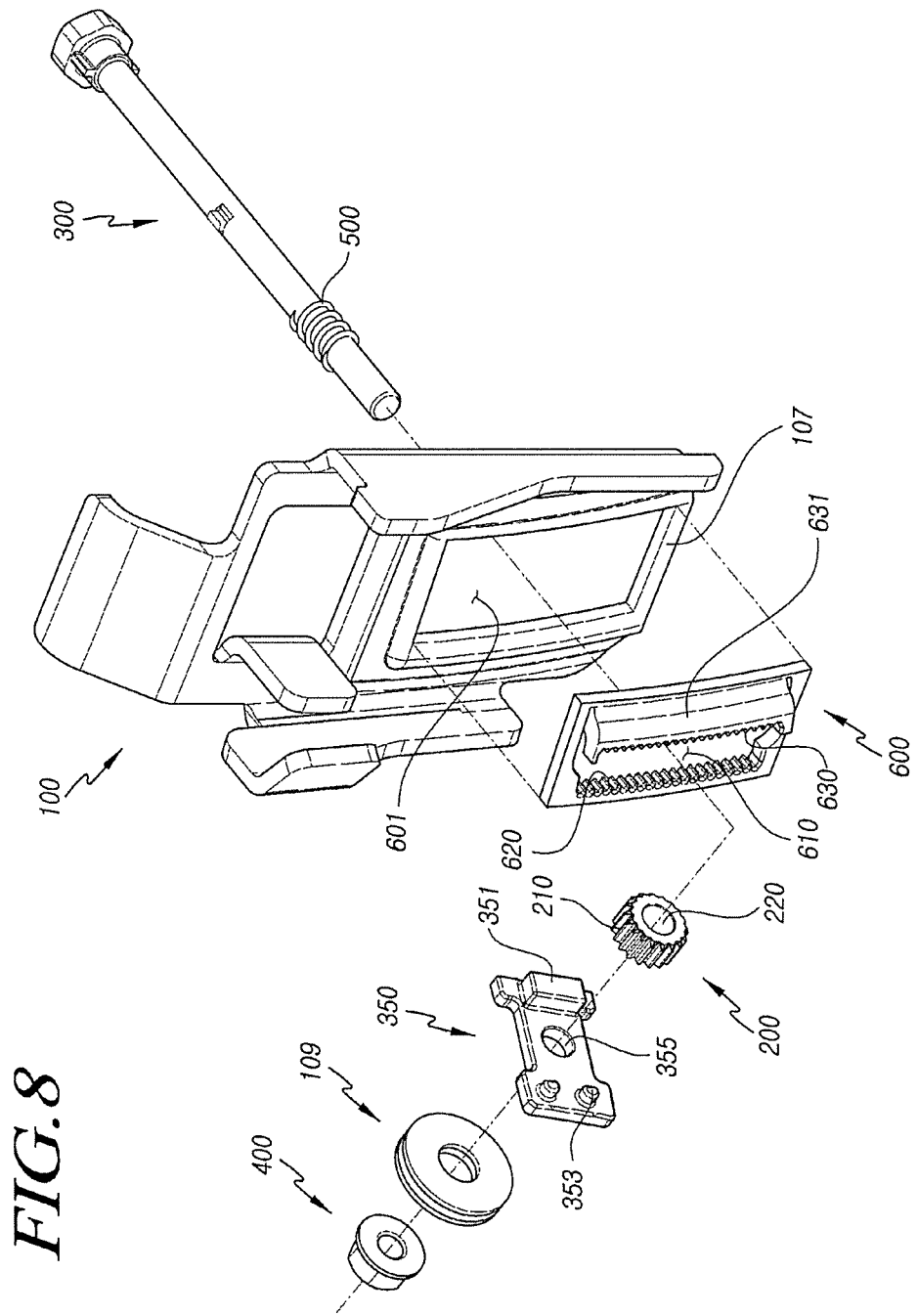

FIG. 1 is a perspective view illustrating a vehicular steering column according to the present embodiments. FIG. 2 is an exploded perspective view illustrating a tilt fixing device of a vehicular steering column according to the present embodiments. FIG. 3 is a front view illustrating a part of a tilt fixing device of a vehicular steering column according to the present embodiments. FIG. 4 and FIG. 5 are sectional views illustrating parts of a tilt fixing device of a vehicular steering column according to the present embodiments. FIG. 6 to FIG. 8 are exploded perspective views illustrating parts of a tilt fixing device of a vehicular steering column according to the present embodiments.

Referring to the drawings, a tilt fixing device of a vehicular steering column according to the present embodiments includes a tilt bracket 100, a movable gear 200, and a lever bolt 300.

The steering column includes a steering shaft 101, an inner tube 102, an outer tube 104, a distance bracket 105, a mounting bracket 106, and an adjustment lever 103.

A tilt hole 110 is formed in a tilt support 107 of the tilt bracket 100, which is supported on the outer side of the distance bracket 105, such that the lever bolt 300 penetrates the same. A first threaded portion 120 is formed on the first side surface of the tilt hole 110. A stepped portion 131 is formed on the second side surface of the tilt hole 100, which faces the first side surface, so as to protrude outward and to have a level difference with regard to the tilt support 107. A second threaded portion 130 is formed on the stepped portion 131.

The tilt hole 110 is elongated in the tilt direction of the steering column. The first threaded portion 120 formed on the first side surface and the second threaded portion 130 formed on the stepped portion 131 on the second side surface are also elongated in the tilt direction of the steering column.

The movable gear 200 and the lever bolt 300 are rotatably coupled to each other. The movable gear 200 has an insertion hole 220 formed at the center thereof such that the lever bolt 300 penetrates the same. The movable gear 200 has a movable threaded portion 210 formed on the outer peripheral surface thereof so as to be inserted into the tilt hole 110 and to mesh therewith.

The movable threaded portion 210 meshes with the first threaded portion 120 and becomes fixed during tilt locking of the adjustment lever 103. During tilt unlocking of the adjustment lever 103, the movable threaded portion 210 is spaced from the first threaded portion 120, meshes with the second threaded portion 130, and rotates/moves in the tilt direction.

The movable gear 200 has the shape of a circular plate such that, during tilt unlocking, the same can mesh with the second threaded portion 130 and rotate/move in the tilt direction. A movable threaded portion 210 is famed on the outer peripheral surface of the movable gear 200.

The lever bolt 300 is coupled to the adjustment lever 103 and rotates while interworking therewith. The lever bolt 300 is installed to penetrate the tilt hole 120 of the tilt bracket 100 and the insertion hole 220 of the movable gear 200.

One end of the lever bolt 300 protrudes toward the outer side of the tilt bracket 100 on one side. A lever nut 400 is coupled to the protruding end of the lever bolt 300. A rotation support member 109, such as a bearing or a washer, may be interposed between the movable gear 200 and the lever nut 400.

An elastic member 500 is coupled to one end of the lever bolt 300. The elastic member 500 is supported on the distance bracket 105 and elastically supports the movable gear 200 such that, when the adjustment lever 103 is released, the movable gear 200 can secure a sufficient distance of spacing from the first threaded portion 120. A coil spring may be used as the elastic member 500 and coupled to the outer peripheral surface of the lever bolt 300.

A head may be provided on a different end of the lever bolt 300 so as to have a diameter larger than the diameter of the lever bolt 300. The head may be coupled to the adjustment lever 103 by a cam unit or the like.

Operations of the tilt fixing device of a vehicular steering column, configured as above, will now be described.

Firstly, the lever bolt 300 is rotated in one direction by manipulating the adjustment lever 103 and is released from the lever nut 400. The movable gear 200 is then spaced from the first threaded portion 120 of the tilt bracket 100 by restoring force from the elastic member 500 and keeps meshing with the second threaded portion 130, thereby releasing the tilt locking condition.

The driver can accordingly perform an operation to tilt the steering column. Following the driver's manipulation, the movable gear 200 engages with the second threaded portion 130 of the tilt bracket 100, rotates, and makes a tilting movement in the upward/downward direction.

After adjusting the angle of the steering column according to his/her body type, on the other hand, the driver needs to switch from the tilt allowing condition to the tilt locking condition. When the lever bolt 300 is accordingly rotated in the opposite direction by manipulating the adjustment lever 103, the lever bolt 300 and the locking unit 400 are fastened to each other, and the movable gear 200 compresses the elastic member 500 and is coupled to the first threaded portion 120. The movable gear 200 is coupled together with the first threaded portion 120 and the second threaded portion 130 of the tilt bracket 100 and becomes tilt-fixed without making further rotations.

The movable threaded portion 210 has threads and troughs foamed in a direction parallel with the axial direction of the lever bolt 300. The first threaded portion 120 has threads and troughs formed to mesh with one side of the outer peripheral surface of the movable threaded portion 210.

The second threaded portion 130 has threads and troughs formed to mesh with the other side of the outer peripheral surface of the movable threaded portion 210 while the first threaded portion 120 and the movable threaded portion 210 mesh with each other.

Particularly, when viewed in the axial direction of the lever bolt 300 as illustrated in FIG. 3, the first threaded portion 120 is formed in the same shape as those of the threads and troughs on one side of the movable threaded portion 210. The second threaded portion 130 is formed in the same shape as those of the threads and troughs on the other side of the movable threaded portion 210. Accordingly, when the movable threaded portion 210 moves in the axial direction of the lever bolt during tilt locking and unlocking, the same meshes with the first threaded portion 120 and the second threaded portion 130.

This prevents engagement between the threads of the first threaded portion 120 of the tilt bracket 100 and the threads of the movable threaded portion 210 (tooth-on-tooth phenomenon) during tilt locking.

As illustrated in FIG. 6 and FIG. 7, the first threaded portion 120 may be formed on one side of a post-shaped first member 125, and the first member 125 may be coupled to the first side surface of the tilt hole 110 by press-fitting, thermal bonding, or the like. Likewise, the second threaded portion 130 may be formed on one side of a post-shaped second member 127, and the second member 127 may be coupled to the stepped portion 131 on the second side surface.

A support member 350 may be installed on the outer side of the movable gear 200. The support member 350 has a through-hole 355 famed therein such that the lever bolt 300 penetrates the same. One end of the support member 350 is supported on a tilt support 107, and a different end thereof is coupled to the lever bolt 300 by the lever nut 400.

The support member 350 includes a first protruding end 351 and a second protruding end 353 provided to protrude from both ends of the inner surface thereof toward the tilt support 107, respectively. During tilt locking, the first protruding end 351 is supported on the outer surface of the tilt support 107, and the second protruding end 353 is supported on the stepped portion 131.

As described above, a rotation support member 109 such as a bearing or a washer may be interposed between the support member 350 and the lever nut 400.

According to the present embodiments described above, no tooth-on-tooth phenomenon occurs between the first threaded portion 120 of the tilt bracket 100 and the movable threaded portion 210 or between the second threaded portion 130 and the movable threaded portion 210 such that the driver can be provided with a stable lever manipulation feeling. The steering column is prevented from popping up due to an external impact and the like, thereby securing the driver's safety.

Referring to FIG. 8, a tilt fixing device of a vehicular steering column according to the present embodiments may include a tilt bracket 100, a lever bolt 300, a gear member 600, and a movable gear 200.

The shapes and functions of the movable gear 200 and the lever bolt 300 are identical or similar to those described above, and repeated description thereof will be omitted herein.

Referring to FIG. 8, the tilt support 107 of the tilt bracket 100 has an incision hole 601 farmed therein. The incision hole 601 is elongated in the tilting direction of the steering column.

A gear member 600 is coupled to the incision hole 601 by press-fitting, thermal bonding, or the like. The gear member 600 has a tilt hole 610 formed in the inner surface thereof such that the lever bolt 300 penetrates the same. One end of the gear member 600 is coupled to the first side surface of the incision hole 601, and a different end thereof is coupled to the second side surface.

A first threaded portion 620 is foamed on the first side surface of the tilt hole 610 foamed in the gear member 600. A stepped portion 631 is formed to protrude from the second side surface, which faces the first side surface, so as to have a level difference with regard to the tilt support 107. A second threaded portion 630 is formed on the stepped portion 631.

The first threaded portion 620 and the second threaded portion 630 mesh with and are coupled to the movable threaded portion 210 of the movable gear 200 as described above.

Particularly, the movable threaded portion 210 has threads and troughs formed in a direction parallel with the axial direction of the lever bolt 300. The first threaded portion 620 has threads and troughs formed to mesh with one side of the outer peripheral surface of the movable threaded portion 210.

The second threaded portion 630 has threads and troughs foamed to mesh with the other side of the outer peripheral surface of the movable threaded portion 210 while the first threaded portion 620 and the movable threaded portion 210 mesh with each other.

Particularly, when viewed in the axial direction of the lever bolt 300, the first threaded portion 620 is formed in the same shape as those of the threads and troughs on one side of the movable threaded portion 210. The second threaded portion 630 is formed in the same shape as those of the threads and troughs on the other side of the movable threaded portion 210, which faces the first threaded portion 620 in the dimeter direction. Accordingly, when the movable threaded portion 210 moves in the axial direction of the lever bolt during tilt locking and unlocking, the same meshes with the first threaded portion 620 and the second threaded portion 630.

This prevents engagement between the threads of the first threaded portion 620 of the gear member 600 and the threads of the movable threaded portion 210 (tooth-on-tooth phenomenon) during tilt locking.

According to the present embodiments described above, it is possible to implement a tilt fixing device of a vehicular steering column wherein no tooth-on-tooth phenomenon occurs between the stationary gear and the movable gear such that the driver can be provided with a stable lever manipulation feeling, and the steering column is prevented from popping up due to an external impact and the like, thereby securing the driver's safety.

It should be understood by a person skilled in the art to which the present embodiments pertain that the present embodiments can be implemented in different specific forms without changing the technical ideas or essential features thereof, and the embodiments described above are illustrated in every aspect, not limiting in any sense. The scope of the present disclosure is defined by the appended claims to be described later, rather than the detailed description. Accordingly, it will be appreciated that all modifications or variations derived from the meaning and scope of the appended claims and their equivalents are included in the range of the present disclosure.

What is claimed is:

1. A tilt fixing device of a vehicular steering column, comprising:
   a tilt bracket having a tilt hole formed in a tilt support formed on an outer side of a distance bracket, a first threaded portion being formed on a first side surface of the tilt hole, a stepped portion being formed to protrude from a second side surface of the tilt hole, which faces the first side surface, so as to have a level difference with regard to the tilt support, and a second threaded portion being formed on the stepped portion;
   a lever bolt coupled to an adjustment lever so as to rotate while interworking with the adjustment lever, the lever bolt being installed to penetrate the distance bracket and the tilt hole; and
   a movable gear having an insertion hole formed to be penetrated by the lever bolt and having a movable threaded portion famed on an outer peripheral surface so as to be inserted into the tilt hole such that the movable threaded portion meshes with the first threaded portion and the second threaded portion and becomes fixed during tilt locking of the adjustment lever and, during tilt unlocking of the adjustment lever, the movable gear is spaced from the first threaded portion, meshes with the second threaded portion, and makes a rotational movement in a tilting direction.

2. The tilt fixing device of a vehicular steering column of claim 1, wherein the movable threaded portion has threads and troughs foamed in a direction parallel with an axial direction of the lever bolt.

3. The tilt fixing device of a vehicular steering column of claim 2, wherein the first threaded portion has threads and troughs foamed to mesh with a side of an outer peripheral surface of the movable threaded portion, and the second threaded portion has threads and troughs famed to mesh with a different side of the outer peripheral surface of the movable threaded portion while the first threaded portion and the movable threaded portion mesh with each other.

4. The tilt fixing device of a vehicular steering column of claim 3, wherein the first threaded portion is foamed on a side of a post-shaped first member, and the first member is coupled to the first side surface of the tilt hole.

5. The tilt fixing device of a vehicular steering column of claim 3, wherein the second threaded portion is fouled on a side of a post-shaped second member, and the second member is coupled to the stepped portion on the second side surface.

6. The tilt fixing device of a vehicular steering column of claim 3, further comprising a support member installed on an outer side of the movable gear such that the lever bolt penetrates and is coupled to the support member, an end of the support member is supported on the tilt support, and a different end of the support member is coupled to the lever bolt by a lever nut.

7. The tilt fixing device of a vehicular steering column of claim 6, wherein the support member has a first protruding end and a second protruding end provided to protrude from both ends of an inner surface of the support member toward the tilt support, respectively, the first protruding end is supported on an outer surface of the tilt support, and the second protruding end is supported on the stepped portion.

8. A tilt fixing device of a vehicular steering column, comprising:
   a tilt bracket having an incision hole formed in a tilt support formed on an outer side of a distance bracket;
   a gear member coupled to the incision hole, the gear member having a tilt hole formed in an inner side, an end of the gear member having a first threaded portion formed on a first side surface of the tilt hole, a stepped portion being formed to protrude from a second side surface of the tilt hole so as to have a level difference with regard to the tilt support, and a second threaded portion being fanned on the stepped portion;
   a lever bolt coupled to an adjustment lever so as to rotate while interworking with the adjustment lever, the lever bolt being installed to penetrate the distance bracket and the tilt hole; and
   a movable gear having an insertion hole formed to be penetrated by the lever bolt and having a movable threaded portion formed on an outer peripheral surface so as to be inserted into the tilt hole such that the movable threaded portion meshes with the first threaded portion and the second threaded portion and becomes fixed during tilt locking of the adjustment lever and, during tilt unlocking of the adjustment lever, the movable gear is spaced from the first threaded portion, meshes with the second threaded portion, and makes a rotational movement in a tilting direction.

9. The tilt fixing device of a vehicular steering column of claim 8, wherein the movable threaded portion has threads and troughs formed in a direction parallel with an axial direction of the lever bolt.

10. The tilt fixing device of a vehicular steering column of claim 9, wherein the first threaded portion has threads and troughs famed to mesh with a side of an outer peripheral surface of the movable threaded portion, and the second threaded portion has threads and troughs famed to mesh with a different side of the outer peripheral surface of the movable threaded portion while the first threaded portion and the movable threaded portion mesh with each other.

11. The tilt fixing device of a vehicular steering column of claim 10, further comprising a support member installed on an outer side of the movable gear such that the lever bolt penetrates and is coupled to the support member, an end of the support member is supported on the tilt support, and a different end of the support member is coupled to the lever bolt by a lever nut.

12. The tilt fixing device of a vehicular steering column of claim 11, wherein the support member has a first protruding end and a second protruding end provided to protrude from both ends of an inner surface of the support member toward the tilt support, respectively, the first protruding end is supported on an outer surface of the tilt support, and the second protruding end is supported on the stepped portion.

* * * * *